United States Patent [19]

Souron

[11] 3,898,346

[45] Aug. 5, 1975

[54] PRESERVATION PROCESS FOR BONE MARROW

[76] Inventor: Yves Marie Frank Souron, 6, Place du Palais, 35000 Rennes, France

[22] Filed: Oct. 9, 1973

[21] Appl. No.: 404,404

[30] Foreign Application Priority Data

Aug. 14, 1973 France .............................. 73.30232

[52] U.S. Cl. ................ 426/325; 426/509; 426/326; 426/393; 426/327; 426/524; 426/328
[51] Int. Cl. ............................................... A23b 1/00
[58] Field of Search ........ 62/60; 426/393, 524, 523, 426/478, 480, 203, 437, 431, 54, 509, 325, 326

[56] References Cited

UNITED STATES PATENTS 3,368,906  2/1968  Coffin et al. ......................... 426/437
3,368,907  2/1968  Miller ................................. 426/437

OTHER PUBLICATIONS

Lambert: Bone Products & Manures, 3rd Ed. 1925, pg. 34 & 35.
Lord: Everybody's Cookbook, 1924, pg. 522–523.

*Primary Examiner*—Norman Yudkoff
*Assistant Examiner*—Hiram H. Bernstein
*Attorney, Agent, or Firm*—Laff, Whitesel & Rockman

[57] ABSTRACT

A preservation process for bone marrow heats marrow or bones in boiling water for a relatively long time. Then the marrow is extracted and enclosed in airtight containers. Next, the containers are frozen at about −18° C or less. For thawing, the containers are heated in a double saucepan at a temperature of at least 90° C. After the heated containers are opened, the marrow may be eaten.

9 Claims, No Drawings

PRESERVATION PROCESS FOR BONE MARROW

The present invention relates to a preservation process for bone marrow as a food.

Gustatory qualities of bone marrow contained in a marrow-bone and boiled, for instance, in the course of the preparation of a soup stock, are well known. Marrow bone is a greasy substance which, after having been boiled and hot, may not only be eaten in one piece, but be easily spread on toasts, etc.

Up to now, marrow preparation has been limited to family. Indeed, amount of bone marrow in a marrow-bone is low and the bone constitutes a voluminous heavy package. This means that marrow presently is a by-product without market value, but rare because, due to bone volume and weight, butchers are supplied therewith or keep only a little number of them.

Furthermore, marrow-bone does not keep well at ambient temperature or even if refrigerated only, the preservation time limit being of 36–48 hours.

A purpose of this invention is to provide a preservation process for boiled marrow so that it keeps a long time its general properties similar to those of marrow which has just been boiled in a marrow-bone, without substantially alter its gustatory properties.

It is obviously known to utilize freezing processes and their derivatives such as deep-freezing processes, etc., for keeping numerous foods. In fact, preservation processes of that type comprise a properly said freezing step which may be more or less rapid, a low teperature storage step and a thawing step. Considering meat as a known example, it is now often agreed that freezing phase must be as rapid as possible while thawing phase must be made slowly, storage phase duration being anyway in a range of duration much longer than for the two other phases.

In the course of repeated experiments, it has been possible to note that, if freezing phase rapidity was less critical, that phase however beginning as soon as possible after marrow has been extracted from boiled bone, it was not possible to provide a slow thawing phase. Indeed, in that case, greasy components of marrow become very rapidly sour in an irreversible manner.

Another purpose of the present invention is thus to provide a thawing process making it possible to avoid marrow souring.

To be noted that finding a solution for that problem permits to provide bone marrow with the market value it has not been up to now, and substantially solves marrow transportation problem. In fact, marrow-bones may be boiled close to each slaughterhouse, marrow may be collected in a closely located small laboratory fitted for that purpose, and finally containers containing marrow blocks may immediately frozen, before transportation. Those containers may be simple glass wide-mouthed bottles such as those already used for packaging numerous preservated foods.

According to a feature of the present invention, there is provided a preservation process for bone marrow heated at 100° C or more wherein either cut or not marrow-bones first are, for instance, boiled in boiling water for a relatively long time, then marrow is extracted from marrow-bones by means of any suitable means and suitable amounts of marrow are enclosed in airtight containers, then the said containers containing marrow are frozen at a temperature of about $-18°$ C or less and stored in that condition, finally for thawing marrow a suitable number of containers are heated in a double saucepan at a temperature of at least 90° C, and after having opened the heated containers, marrow may be eaten as it has just been boiled.

According to another feature of this invention, from the time a container is taken out from the freezer to that time it is heated in the said double saucepan, not more than 1 hour and a half must elapse, whether the container is at ambient temperature or in refrigerator, that is always a shorter time than that needed for a natural thawing.

A purpose of the present invention is also to provide a preservation process for bone marrow as a usual perishable food, such as milk, butter, eggs, etc.

According to a feature of this invention, there is provided a preservation process for bone marrow wherein any thermal processing of the marrow is performed at a temperature that is always less than 100° C.

According to another feature of this invention, there is provided a preservation process for bone marrow wherein marrow-bones are heated in a liquid at a temperature from about 35° C to 100° C, but less than 100° C, before extracting the marrow which is enclosed into containers, then the said airtight containers are heated again at a temperature from 50° to 100° C, but less than 100° C, then cooled and possibly either refrigerated or frozen, the marrow being thus marketable inside its container as any usual cooked food.

According to another feature, containers containing marrow and having been made airtight after marrow has been introduced into them are submitted to two or three heating and cooling cycles, heating temperature being always kept between 50° and 100° C, but less than 100° C, time interval during each cycle being possibly of several hours, containers being possibly frozen or kept at ambient temperature after the last cycle for commercialization purpose.

According to another feature, in the above mentioned process, heating temperature is of about 80° C.

According to another feature, in the above mentioned process heating temperature is of about 95° C.

According to another feature, there is provided a preservation process for bone marrow wherein marrow-bones are heated in a liquid at a temperature of about 60° C for about 15 minutes, before extracting marrow which is introduced into either airtight or not airtight containers, then the said containers are frozen at a normal freezing temperature, the marrow being then commercialized either frozen or at ambient temperature as usual precooked food.

The above mentioned features and others will appear more clearly from the following description of bone marrow preservation trials.

The following description will relate in a first part trials made on marrow heated over 100° or at 100° C, in a second part trials made on marrow wherein heating temperature is always kept lower than 100° C, and in a third part, trials made in adding a certain number of products to marrow, whatever is the heating temperature.

I - FIRST PART -

Trials on marrow heated at 100° C or more

In this first part, each group of trials comprised a first sequence of common operations for producing boiled marrow. One or several fresh bones were processed which were preferably transversally cut. Pieces of bone were poured into a vessel containing, for instance, 10 liters of water and, in addition, a number of ingredients such as carrot, leek, onion, salt, pepper and aromatics. The mixture was boiling during about 1 hour and boiled bones were separated. Cooked marrow was extracted from its casing by means of a spoon or by blowing it.

In a second sequence of still common operations, wide-mouthed bottles were filled with hot marrow in suitable quantity. Then bottles were closed either in an airtight manner or not and put into a freezer at $-18°$ C where they were kept a more or less long time.

Then in a first group of trials, a first set of bottles was brought out of the freezer and let at ambient temperature for 3-4 hours, for instance. When opening the wide-mouthed bottles, it was noted first a bad smell, then after having made the marrow hot again for thawing it, it was noted that it has a soap taste or a rancid grease taste.

In a second group of trials, a second set of bottles was brought out of the freezer and put in the under part of a refrigerator, that is where temperature varies from 7° to 10° C, for a time duration similar to that mentioned for the former trials. When opening the wide-mouthed bottles, it was also noted a bad smell and the thawed marrow has still a rancid taste.

Thus it seemed that frozen marrow did not stay several hours between cold temperatures of about 0° C and ambient temperature. To be noted that alteration is relatively rapid for a product having been just thawed and, in addition, that such an alteration is irreversible, that is it destroys the qualities specific to bone marrow.

In a third group of trials, a third set of bottles was brought out of the freezer and immediately opened. Marrow smell was excellent. The marrow was heated again directly in a saucepan. A broiled grease was produced which has no connection with eatable marrow.

Finally, in a fourth group of trials, a fourth set of bottles, brought from the freezer, was heated in a double saucepan located in a vessel containing water at a temperature of about 90°-100° C, during 10-15 minutes. Water level preferably was higher than marrow level in the bottles for producing a rapid homogeneous heating and thawing. After bottles have been opened, it was noted that marrow had substantially the same properties as original boiled marrow.

That fourth group of trials has been resumed in providing a time interval from bottle output from the freezer to heating in the double saucepan. It was noted that such a time interval must not be longer than 2 hours or 2½ hours. Beyond that limit, the same drawbacks were met as in the first or second group of trials.

Indeed this has led to the assumption that, when marrow is being heated up to ambient temperature, it does not substantially degrade, but at ambient temperature reactions are accelerated which results in a very rapid deterioration.

As a result, a fifth group of trials was made wherein bottles were taken out from the freezer and put into a refrigerator close to the refrigerator freezer component, i.e. at temperature of about 0°-4° C, during about a dozen hours. Bottles were then brought out of the refrigerator and immediately heated in a double saucepan. They produced an excellent marrow. Bottles let a short time - about 5 minutes - out of the refrigerator, then heated in a double saucepan resulted in a degraded marrow. That shows well the degrading effect of ambient temperature - from 15° to 20° C - to be rapidly passed through.

The conclusion of those trials is that it is possible, by applying the process according to this invention as described in the fourth group of trials as well as partially in the fifth group, to keep boiled marrow in freezing it and to render it eatable in relatively rapidly heating it in a double saucepan. That proves that marrow may be a commercializable product, after having been submitted to an industrial type process, instead of remaining a no-value product.

To be noted that ingredients put in the water used for boiling marrow-bones particularly serve to make marrow taste more palatable.

II - SECOND PART -

Trials on marrow heated under 100° C

In a sixth group of trials, marrow-bones were heated in water, preferably at 80° C, then sawed for extracting marrow from the bones, marrow being then put into bottles to fill them up. Preferably bottles were closed in an airtight manner, all filling operations being preferably performed in the best hygienic conditions. Then bottles were frozen at $-18°$ C or at a lower temperature. It has been possible to note that bottles could be brought out of the freezer and set at ambient temperature during several days, without altering the marrow, or at a temperature of 15° C or less, as in a refrigerator during a still longer period. For eating that marrow, it is sufficient to heat and to thaw it to recognize substantially the same savour as boiled bone marrow savour.

In a seventh group of trials, marrow-bones were heated to melt marrow, but always at a temperature less than 100° C, then marow was poured into widemouthed bottles which were compulsory filled up and hermetically closed. Marrow must necessarily be prepared in the best possible hygienic conditions and without contacting air too much, from bones of animals which had been very recently killed, if possible the same day. All those conditions being fulfilled, the bottles were heated once, twice, three or four times between 50° and 100° C. Each heating phase was followed by a cooling phase. It can be established that bottles kept well and for a long time at 15° C. After having been processed they also may be frozen.

In those two last groups of trials, marrow-bone heating time has varied from 30 minutes to 1 hour and more for establishing that heating time has no substantial influence on marrow savour. Likely, heating time has varied during the following heating-cooling cycles without establishing noticeable influence. Still to be noted that during heating-cooling cycles the cooling duration may vary, but cooling must be rapid.

Also bones having different ages were employed without exceeding a limit of 36 hours after which raw marrow is altered, and it has been established that for the oldest bones preservation after thawing of frozen bottles was reduced. To be noted that it is practical to use bones of animals killed the preceding day, the bones being kept at a temperature of about 4° C which renders boning easier. Thus grease and tendons, still bound to bones, are easily removed, which avoids any mixture of grease with marrow.

An eighth and a ninth groups of trials were made in the same conditions as in the sixth and seventh ones, but heating phase temperature was of 95° C. Substantially the same results were obtained as at 80° C. However, it was established that marrow processed at 95° C had a better taste.

Other trials were made at heating temperature comprised between those two temperatures and it must be remembered that the main result of the process is that marrow frozen after the process may be thawed without altering it which enables commercialization without danger. Also it must be remembered that marrow processed between about 80° and 95° C may be considered as cooked, i.e. for eating it it is sufficient to heat it a few minutes.

In a tenth group of trials, marrow-bones were heated in water at about 60° C, during about 15 minutes, then sawed for extracting marrow which was then put into preferably filled-up and hermetically closed bottles, this being not compulsory. Then bottles were frozen at about − 18° C or at a lower temperature. It was possible to establish that bottles could then be brought out of the freezer and, even opened, marrow kept its wholesome aspect and taste, that is it did not alter at ambient temperature during 15 days or more. It must be noticed that thus processed marrow must be considered as only pre-cooked, i.e. before eating it, it must be heated for a certain time at a temperature of about 80° C.

III - THIRD PART

Trials with additions of products

In an eleventh group of trials, bottles containing marrow as processed in previous groups of trials were selected and additional products such as antioxidant products, as vitamin E, such as either antibiotic or antifungicide products, such as homeopathic preparation, such as salt. It was established that marrow preservation duration was still lengthened as well as frozen marrow thawing conditions.

In a twelfth group of trials, still applying the already described processes as in the former first and second parts, bones were previously processed in pickling brine to still establish an improvement.

Still important to be noted that heated marrow may be extracted from bone by means of a spoon or blown out, or extracted with any suitable means. Also to be noted that bone heating water may seasoned by using ingredients able to render marrow more palatable. Among those ingredients, it is possible to mention vegetables, salt, spices, etc.

Thus marrow may reach a commercial value, it has not had up to now, and is easily transportable. Indeed marrow bones may be processed in the vicinity of each slaughterhouse, marrow may be extracted in a small laboratory arranged for that purpose, and finally containers or bottles filled with marrow may be processed as hereabove mentioned and the most often frozen before transportation.

While the principles of the present invention have hereabove been described in relation with specific trials, it must be understodd that the said description has only been made by way of example and does not limit the scope of this invention.

What is claimed is:

1. A preservation process for bone marrow, comprising the steps of boiling marrow-bones in boiling water for a relatively long time, extracting marrow from marrow-bones, enclosing suitable amounts of marrow in airtight containers, freezing and thereafter storing said containers containing marrow at a temperature of about −18° C or lower, thawing and heating marrow containers in double saucepans at a temperature of at least 90° C, whereby said heated containers may be opened and said marrow may be eaten wherein the thawing and heating steps are carried out in the said double saucepan within one hour and a half total elapsed time.

2. The preservation process of claim 1 wherein each and every one of the thermal processing steps is performed at a temperature that is always less than 100° C.

3. The preservation process according to the claim 2, wherein said marrow-bones are heated in a liquid and at a temperature in the range from about 35° to not over 100° C before extracting the marrow, and then reheating said airtight containers at a temperature from 50° to not over 100° C.

4. The preservation process according to the claim 2, wherein said airtight containers are submitted to two or three heating-cooling cycles, each of said heating cycles being at temperature always kept between 50° and not over 100° C the time interval during each cycle being in the order of several hours.

5. The preservation process according to claim 2 wherein said heating temperature is of about 80° C.

6. The preservation process according to claim 2, wherein said heating temperature is of about 95° C.

7. The preservation process according to claim 2, wherein said marrow-bones are heated in a liquid at a temperature of about 60° C for about 15 minutes and said containers are frozen at a normal freezing temperature.

8. The preservation process according to claim 1 and the step of adding to marrow inside containers, an antioxidant vitamin E products, an antibiotic and antifungicide products.

9. The preservation process according to claim 1 and the added step of preprocessed said marrow-bones in pickling brine.

* * * * *